United States Patent
Yang et al.

(10) Patent No.: US 9,699,435 B2
(45) Date of Patent: Jul. 4, 2017

(54) LIQUID CRYSTAL DRIVING METHOD AND APPARATUS FOR BLACK FRAME INSERTION OF IMAGE, AND LIQUID CRYSTAL DISPLAY DEVICE

(71) Applicants: HISENSE HIVIEW TECH CO., LTD, Qingdao, Shandong (CN); HISENSE USA CORPORATION, Suwanee, GA (US)

(72) Inventors: Jie Yang, Shandong (CN); Shunming Huang, Shandong (CN)

(73) Assignees: HISENSE HIVIEW TECH CO., LTD, Qingdao, Shandong (CN); HISENSE USA CORPORATION, Suwanee, GA (US)

( * ) Notice: Subject to any disclaimer, the term of this patent is extended or adjusted under 35 U.S.C. 154(b) by 45 days.

(21) Appl. No.: 14/145,148

(22) Filed: Dec. 31, 2013

(65) Prior Publication Data
US 2015/0062200 A1    Mar. 5, 2015

(30) Foreign Application Priority Data
Aug. 27, 2013    (CN) .......................... 2013 1 0377489

(51) Int. Cl.
*G09G 3/36*    (2006.01)
*H04N 13/00*    (2006.01)
(Continued)

(52) U.S. Cl.
CPC ......... *H04N 13/0033* (2013.01); *G09G 3/003* (2013.01); *H04N 13/0438* (2013.01);
(Continued)

(58) Field of Classification Search
CPC .............................. G09G 3/36; G09G 3/3685
(Continued)

(56) References Cited

U.S. PATENT DOCUMENTS

| 2008/0238854 A1 | 10/2008 | Kimura |
| 2009/0058789 A1* | 3/2009 | Hung .................. G09G 3/3648 |
| | | 345/100 |

(Continued)

FOREIGN PATENT DOCUMENTS

| CN | 1804984 A | 7/2006 |
| CN | 101533622 A | 9/2009 |

(Continued)

OTHER PUBLICATIONS

State Intellectual Property Office of People's Republic of China, "First Office Action and Search Report for CN Application No. 201310377489.x", China, Feb. 3, 2015.

*Primary Examiner* — Chanh Nguyen
*Assistant Examiner* — Daniel Duong
(74) *Attorney, Agent, or Firm* — Tim Tingkang Xia, Esq.; Locke Lord LLP

(57) ABSTRACT

The invention discloses a liquid crystal driving method and apparatus for black frame insertion of an image, and a liquid crystal display device. The method includes, in a black frame insertion period after the frame period ends, sending, by a timing controller, a row of black image data to a register of a source driver; and in the black frame insertion period, maintaining, by the register, the row of black image data being output until the black frame insertion period ends, so as to enable the row of black image data to refresh each row of liquid crystal cells. Accordingly, the complexity of driving processes and the data calculations in the black frame insertion are greatly reduced.

16 Claims, 6 Drawing Sheets

(51) Int. Cl.
*H04N 13/04* (2006.01)
*G09G 3/00* (2006.01)

(52) U.S. Cl.
CPC ............. *G09G 3/36* (2013.01); *G09G 3/3648* (2013.01); *G09G 2310/08* (2013.01); *G09G 2320/0209* (2013.01)

(58) Field of Classification Search
USPC .................................................. 345/690, 100
See application file for complete search history.

(56) References Cited

U.S. PATENT DOCUMENTS

| | | | |
|---|---|---|---|
| 2010/0177028 A1* | 7/2010 | Hsu et al. ..................... | 345/100 |
| 2011/0292041 A1 | 12/2011 | Lee et al. | |
| 2012/0120128 A1* | 5/2012 | Oh ..................... | H04N 13/0438 345/691 |
| 2012/0176359 A1* | 7/2012 | Xiao et al. ..................... | 345/211 |
| 2013/0082999 A1* | 4/2013 | Ahn et al. ..................... | 345/212 |
| 2013/0271504 A1* | 10/2013 | Kim et al. ..................... | 345/690 |
| 2014/0168281 A1* | 6/2014 | Ahn et al. ..................... | 345/690 |

FOREIGN PATENT DOCUMENTS

| | | |
|---|---|---|
| CN | 102436798 A | 5/2012 |
| CN | 102906808 A | 1/2013 |
| CN | 103051914 A | 4/2013 |

\* cited by examiner

LIQUID CRYSTAL DRIVING METHOD AND APPARATUS FOR BLACK FRAME INSERTION OF IMAGE, AND LIQUID CRYSTAL DISPLAY DEVICE

CROSS-REFERENCE TO RELATED APPLICATION

This application claims the priority to Chinese Patent Application No. 201310377489.X, filed on Aug. 27, 2013, in the State Intellectual Property Office of P.R. China, which is hereby incorporated herein in its entirety by reference.

FIELD OF THE INVENTION

The present invention relates generally to image displaying, and more particularly to a liquid crystal driving method and apparatus for black frame insertion of an image, and a liquid crystal display with the liquid crystal driving method and apparatus.

BACKGROUND OF THE INVENTION

With advance of information technologies, three-dimensional (3D) liquid crystal televisions are increasingly popular. Shutter glasses-type 3D liquid crystal televisions are capable of maintaining the original resolution of an image, and therefore are capable of displaying an image with a full high definition 3D effect. The shutter glasses-type 3D liquid crystal televisions are the mainstream in the market. By improving the image refreshing rate, and dividing a frame of an image into two parts, the shutter-type 3D technology forms two groups of images corresponding to left and right eyes on which are displayed in a staggered manner.

FIG. 1 is an operation timing diagram of a shutter-type 3D glasses in the prior art. Left and right eye images of an image are displayed consecutively and alternately on a liquid crystal display (LCD) device. Moreover, when the left eye image is displayed, a left eyeglass is turned on and a right eyeglass is turned off; when the right eye image is displayed, the right eyeglass is turned on and the left eyeglass is turned off, so as to ensure that left and right eyes see different respective images, namely, the left eye only sees the left eye image, and the right eye only sees the right eye image. The left and right eye images are synthesized into a 3D image in the brain.

In the shutter-type 3D technology, left and right eye images of an image are alternately displayed, and crosstalk may easily occur, where the received left eye image includes content of the right eye image, and the received right eye image includes content of the left eye image, and left and right eye images interfere with each other to cause errors in the formed 3D image.

One reason is that, the screen of the LCD device performs image displaying in a sequential scanning manner from top to bottom. When the LCD device displays the left eye image, the left eye receives the left eye image, the left eye image is scanned to a final row, then the right eye image begins to be scanned from a first row, and the right eye begins to receive the right eye image. However, a left eye image of a previous frame is still kept on other rows (from a second row to the final row) of the liquid crystal screen, so the right eye image received by the right eye includes a part of the left eye image, and likewise, the left eye image received by the left eye includes a part of the right eye image, so as to form the crosstalk between the left and right eye images.

Conventionally, the crosstalk may be solved by inserting black images between the left and right images so as to make the left eye receive the left eye image and the black image simultaneously, and the right eye receive the right eye image and the black image simultaneously. Because the inserted black images are background images, no crosstalk occurs between the black image and a frame image. However, the driving method for such insertion of the black images is usually very complicated.

Therefore, a heretofore unaddressed need exists in the art to address the aforementioned deficiencies and inadequacies.

SUMMARY OF THE INVENTION

According to the present invention, a liquid crystal driving method for black frame insertion of an image is provided, which simplifies the driving complexity of the black frame insertion, and reduces the amount of data operations in a black frame insertion process. Furthermore, the displaying luminance of a 3D image is improved by reducing the time length of a black frame insertion period.

In one aspect, the present invention discloses a liquid crystal driving method for black frame insertion of an image, applied to a LCD device, where in an image driving process, a frame period and a black frame insertion period are alternately next to each other. The method includes the following steps:

step 1, in a black frame insertion period after the frame period ends, sending, by a timing controller, a row of black image data to a register of a source driver; and step 2, in the black frame insertion period, maintaining, by the register, the row of black image data being output until the black frame insertion period ends, so as to enable the row of black image data to refresh each row of liquid crystal cells.

In one embodiment, the step 2 of maintaining, by the register, the row of black image data being output until the black frame insertion period ends includes: generating, in a TP signal, a falling edge and maintaining the TP signal at a low level until the black frame insertion period ends.

In one embodiment, the step 1 sending, by the timing controller, the row of black image data to the register of the source driver includes: after the frame period ends, generating, in a CPV signal, a rising edge to turn on a first row of liquid crystal cells, and sending, by the timing controller, the row of black image data to the register of the source driver; and the step 2 of maintaining, by the register, the row of black image data being output until the black frame insertion period ends includes in a duration when the first row of liquid crystal cells are turned on, when a falling edge of a TP signal occurs, setting an OE signal at the falling edge, refreshing the first row of liquid crystal cells with the row of black image data, maintaining the TP signal at a low level after the falling edge until the black frame insertion period ends; and in a duration when the TP signal is maintained at the low level, at each falling edge of the OE signal, refreshing a corresponding row of liquid crystal cells with the row black image data.

In one embodiment, the frequency of a CPV signal in the black frame insertion period is $2^N$ times of that of the CPV signal in the frame period, where N is an integer greater than or equal to 0.

The driving method is applicable to a shutter glasses-type 3D liquid crystal display device.

In another aspect, the present invention discloses a liquid crystal driving apparatus for black frame insertion of an image, including: a timing controller, a gate driver and a source driver. In an image driving process, a frame period and a black frame insertion period are next to each other. The timing controller, a gate driver and a source driver are configured such that, in a black frame insertion period after the frame period ends, the timing controller sends a row of black image data to a register of the source driver; and the register maintains the row of black image data being output until the black frame insertion period ends, so as to enable the row of black image data to refresh each row of liquid crystal cells.

In one embodiment, the timing controller is configured to generate control signals including at least a TP signal and a CPV signal.

In one embodiment, in the black frame insertion period, the timing controller controls the TP signal to generate a falling edge and be at a low level, so as to enable the register to maintain the row of black image data being output.

In one embodiment, the frequency of the CPV signal in the black frame insertion period is $2^N$ times of that of the CPV signal in the frame period, where N is an integer greater than or equal to 0.

In one embodiment, the apparatus is applicable to a shutter glasses-type 3D LCD device.

In yet another aspect, the present invention discloses an LCD device includes the liquid crystal driving apparatus as disclosed above.

In a further aspect, the present invention discloses a liquid crystal driving method for black frame insertion of an image, applied to an LCD device. The method includes the following steps:

At step 21, sending, by a timing controller, a row of black image data to a register of a source driver;

At step 22, refreshing a first row of liquid crystal cells by using the row of black image data; and At step 23, maintaining, by the register, the row of black image data being output, and refreshing a second row of liquid crystal cells to a final row of liquid crystal cells sequentially by using the row of black image data.

In one embodiment, the step 22 of refreshing the first row of liquid crystal cells by using the row of black image data further includes: in a duration when a CPV signal is at a high level, when a falling edge of a TP signal occurs, setting an OE signal at the falling edge, and refreshing the first row of liquid crystal cells with the row of black image data.

The step 23 of maintaining, by the register, the row of black image data being output, and refreshing a second row of liquid crystal cells to a final row of liquid crystal cells sequentially by using the row of black image data further includes: maintaining a TP signal at a low level; and in a duration when the TP signal is maintained at the low level, when a CPV signal is at a high level and a falling edge occurs in an OE signal, refreshing a corresponding row of liquid crystal cells with the row of black image data.

According to the present invention, the driving complexity of black frame insertion is simplified, and the amount of data operations in a black frame insertion process is reduced. Particularly, the black frame insertion is implemented by controlling a logic state of a single signal (TP signal), so as to avoid repetitive calculation in a source driver, and reduce the program complexity. Additionally, the displaying luminance of a 3D image is improved by reducing the time length of a black frame insertion period.

These and other aspects of the invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE INVENTION

Figure 1:
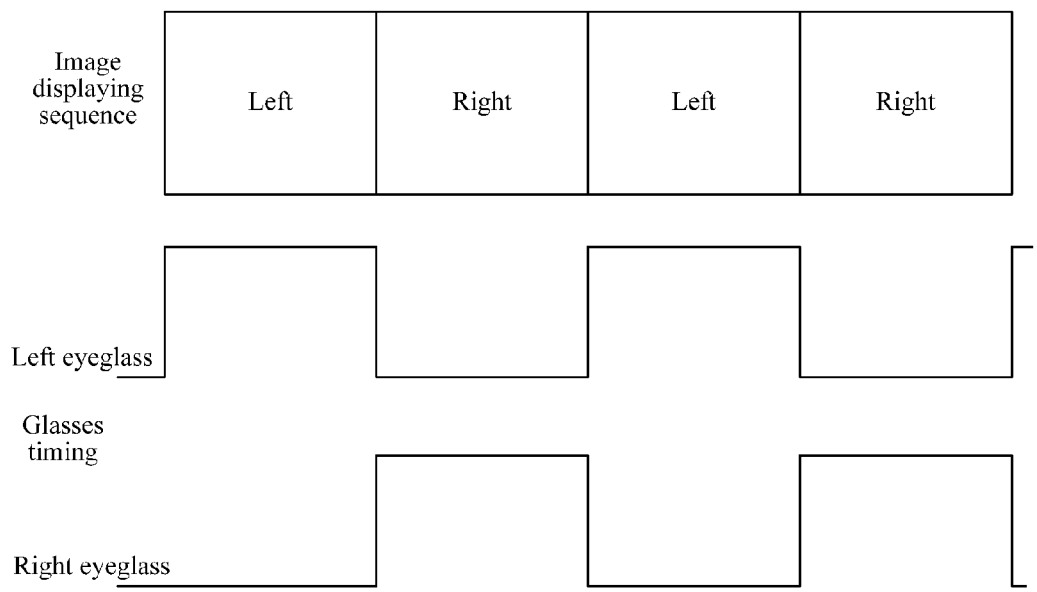
FIG. 1 is an operation timing diagram of a shutter-type 3D glasses in the prior art.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the invention in conjunction with the accompanying drawings in FIGS. 2-6. It should be understood that specific embodiments described herein are merely used for explaining the invention, but are not intended to limit the invention. In accordance with the purposes of this disclosure, as embodied and broadly described herein, this invention, in one aspect, relates to a liquid crystal driving method for black frame insertion of an image. In another aspect, the present invention relates to a liquid crystal driving apparatus for black frame insertion of an image, which includes: a timing controller, a gate driver and a source driver and a liquid crystal display (LCD) panel with the liquid crystal driving method. Additionally, the present invention further discloses a LCD device having the liquid crystal driving apparatus.

Figure 2:
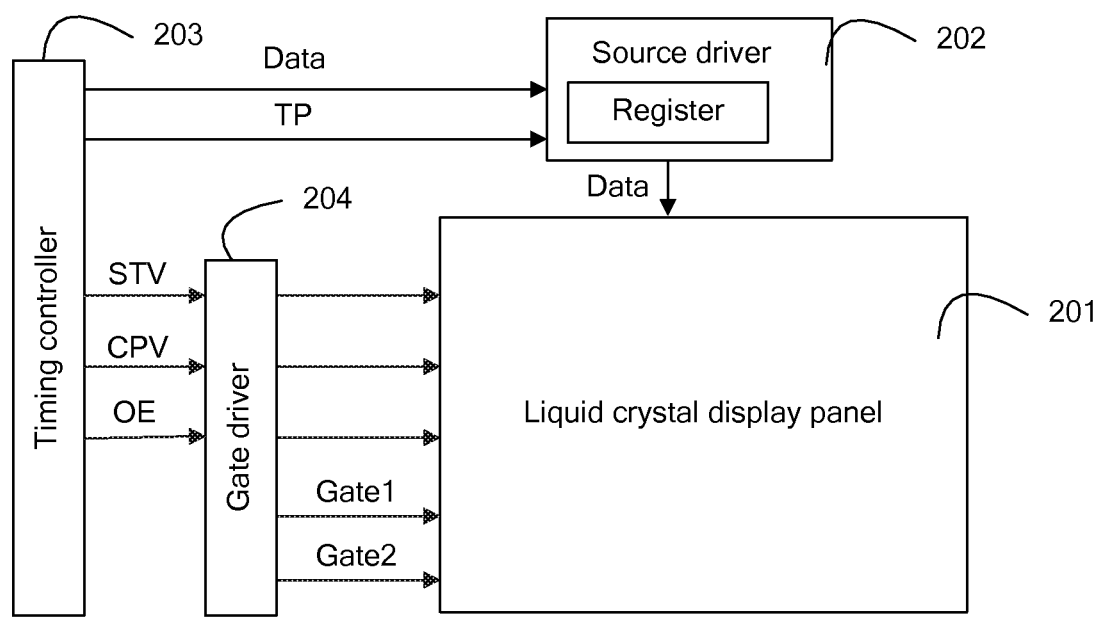
FIG. 2 is a schematic structural diagram of a liquid crystal display device according to one embodiment of the present invention.

As shown in FIG. 2, the LCD device mainly includes a thin-film-transistor (TFT) LCD panel 201, a source driver 202, a gate driver 204 and a timing controller (TCON) 203. The TFT LCD panel 201 includes multiple rows of liquid crystal cells. This exemplary embodiment uses 1080 rows as an example, and other numbers of rows are also within the disclosure scope of the present invention.

Timing control signals output by the timing controller 203 mainly include an STV signal, a CPV signal, an OE signal, and a TP signal. The STV signal, the CPV signal, and the OE signal are control signals provided by the timing controller 203 to the gate driver 204, and the TP signal is a control signal provided by the timing controller 203 to the source driver 202. The timing controller 203 further provides the source driver 202 with a data signal, Data, written into a liquid crystal cell. It should be appreciated that other control signals, such as one or more general purpose output signals may additionally be provided.

The STV signal is a field synchronization signal, that is, an initial signal of each frame of an image. In the SPV signal, each frame of the image has a corresponding pulse.

The CPV signal is a clock signal output by the timing controller 203 to the gate driver 204, and is used as a control signal for turning on a liquid crystal cell. Each rising edge of the CPV signal correspondingly turns on a row of liquid crystal cells in a liquid crystal panel.

Gate1, Gate2, ..., and Gate 1080 control signals sent out by a circuit for gates of respective rows of liquid crystal cells, and specifically control turn-on and turn-off of all rows of liquid crystal cells.

The TP signal is a latching signal of the data signal, Data, output by the timing controller 203 to the source driver 202, and is a control signal of image data in a register of the source driver 202. A rising edge of the signal denotes that content of the register is already prepared to latch data, and gray scale voltage conversion may be performed; a falling edge denotes that the gray scale voltage conversion is already completed for the data of the register, so as to prepare to output a gray scale voltage.

The OE signal is an output enabling signal that controlling the output of the gate driver 204. When the OE signal is at a high level, all output channels of the gate driver 204 are turned off, and when the OE signal is at a low level, normal output is performed. The OE signal enables time points of turning on two consecutive rows of liquid crystal cells to be at a certain interval, which functions to prevent crosstalk between outputs of two neighboring rows of liquid crystal cells. After data written into a TFT of a row of liquid crystal cells is prepared, the OE signal turns on the TFT of the row of liquid crystal cells to transmit data, turns off the TFT after the data of this row is completely transmitted, and then turns on a TFT of a next row of liquid crystal cells when data of the next row comes, so as to prevent the row crosstalk phenomenon from occurring.

Figure 3:
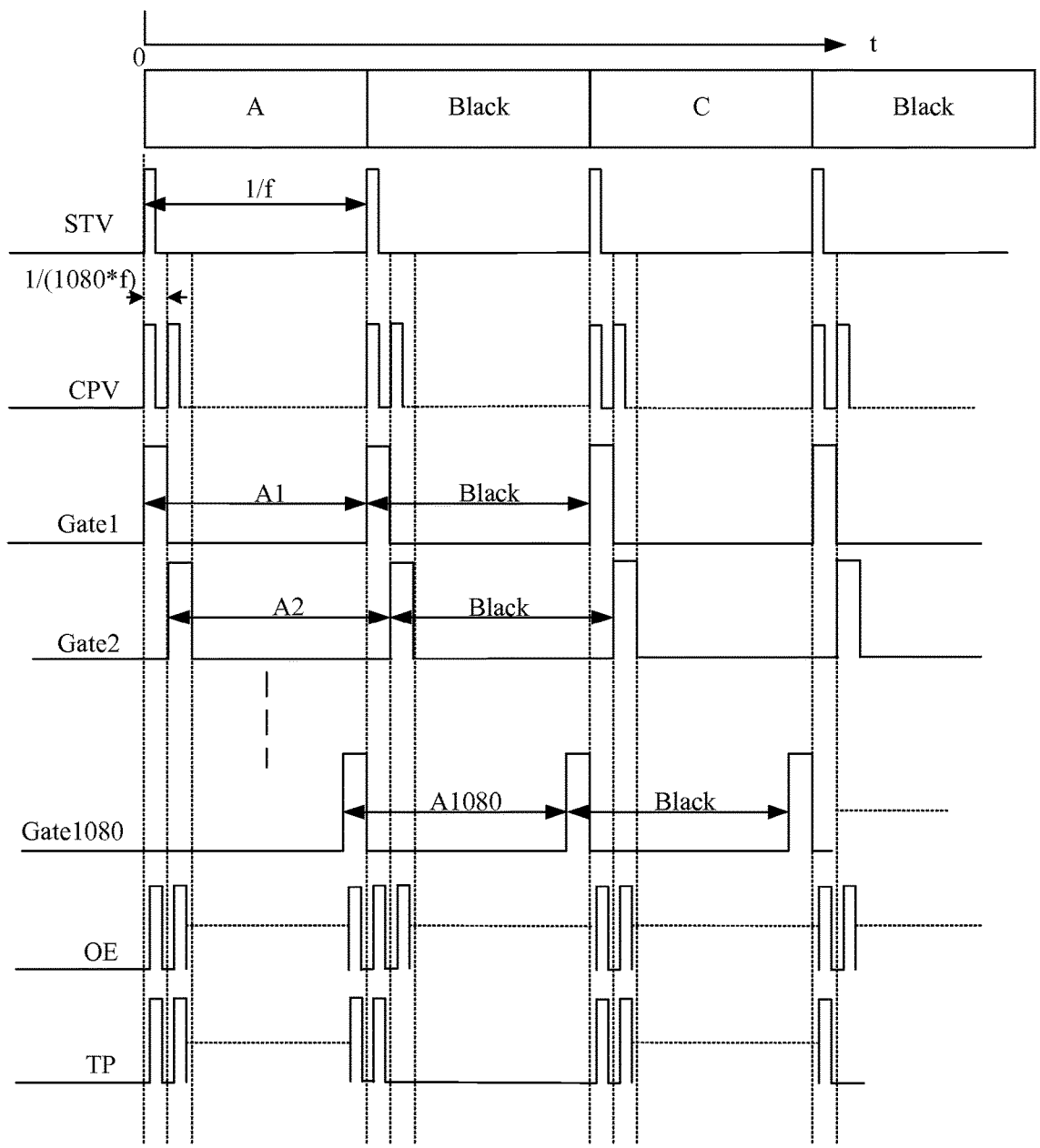
FIG. 3 is a timing diagram of a liquid crystal driving method for black frame insertion of an image according to one embodiment of the present invention.

Referring to FIG. 3, a timing diagram of a liquid crystal driving method for black frame insertion of an image is shown according to one embodiment of the present invention. In this embodiment, the CPV signal, the OE signal, and the TP signal have the same frequency f, which is, for example, 240 Hz. The time length of high levels of Gate1-Gate1080 signals is 1/(1080*f). Assuming that the data signal, Data, includes images A, B, C and D in sequence, it can be known according to the control signals, when the CPV signal is at a rising edge and the Gate1 signal is at a rising edge, a first row of liquid crystal cells are turned on, the timing controller 203 sends out data to be written into the first row of liquid crystal cells corresponding to the image A, after being sent out by the timing controller 203, the data is contemporarily stored in the register of the source driver 202, and a gray scale converter performs gray scale voltage conversion on the data in the time when the TP signal is at a high level. When a falling edge in the TP signal comes, the OE signal is set in a state of a falling edge, so that the gate driver 204 performs output, and a voltage value obtained after the conversion is written into a corresponding row of liquid crystal cells which are turned on, for example, the first row of liquid crystal cells. Therefore, liquid crystals of the first row of liquid crystal cells are flipped, thereby completing refreshing of the row of liquid crystal cells. Subsequently, when the CPV signal is at a rising edge and the Gate2 signal is at a rising edge, a second row of liquid crystal cells are turned on, and the foregoing steps are cyclically executed. After all row writing operations of the image A are completed, the image B begins to be transmitted. The rest operations can be deduced by analogy.

In this embodiment, the images B and D are black images, where the image A, the black image (i.e., image B), the image C, and the black image (i.e., image D) are sequentially written into the liquid crystal cells. A period when the images A and C are written is a frame period, and a period when the black images are written is a black frame insertion period. The frame period and the black frame insertion period are next to each other.

For the TFT LCD panel 201 having 1080 rows of liquid crystal cells, each image has 1080 rows of data, and for each image, a CPV signal has 1080 pulses. It should be noted that other numbers of rows of liquid crystal cells can also be utilized to practice the present invention.

For the image A, when a first rising edge of the CPV signal occurs, the Gate1 signal is triggered to generate a rising edge, the first row of liquid crystal cells are turned on, and the timing controller 203 sends out a first row of data corresponding to the image A. After being sent out by the timing controller 203, the first row of data is contemporarily stored in the register of the source driver 202.

In a duration when the Gate1 signal is at a high level, that is, the first row of liquid crystal cells are turned on, when a rising edge occurs in the TP signal, the register of the source driver 202 receives the first row of data sent out by the timing controller 203. When a falling edge occurs in the TP signal, the register outputs the first row of data. When the falling edge of the TP signal comes, the OE signal is placed in a state of a falling edge, so as to enable the gate driver 204 to perform normal output, the first row of data is written into a corresponding row of liquid crystal cells which are turned on, that is, the first row of liquid crystal cells, and the first row of liquid crystal cells enable liquid crystals to be flipped according to the received first row of data. Refreshing of the first row of liquid crystal cells is completed.

Subsequently, when a second rising edge occurs in the CPV signal and the Gate2 signal is at a rising edge, a second row of liquid crystal cells are turned on, the timing controller 203 sends out a second row of data corresponding to the image A to the register, a same driving process as that for the first row of liquid crystal cells is executed, the rest operations can be deduced by analogy until a 1080th row of liquid crystal cells, and writing of the image A is completed.

After writing of all rows (1080 rows shown in the drawing) of the image A is completed, data of a black image (i.e., image B) begins to be written, and a black frame insertion period starts. At this time, when the CPV signal is again at a rising edge and the Gate1 is at a rising edge, the first row of liquid crystal cells are turned on, the timing controller 203 sends out a row of black image data, that is, data to be written into the first row of liquid crystal cells to the register. In a duration when the Gate1 signal is at a high level, a falling edge occurs in the TP signal, and at this time, the OE signal is placed in a state of a falling edge to enable the gate driver 204 to perform normal output and write the row of black image data into the first row of liquid crystal cells which are turned on. Subsequently, the TP signal is maintained at a low level, and content stored in the register is kept as the row of black image data and is maintained being output, until the black frame insertion period ends. The OE signal is kept to be periodic enabling, so as to trigger the gate driver 204 to perform normal output. In FIG. 3, a dashed line denotes that the signal repetitively occurs at a predetermined frequency.

Subsequently, the CPV signal is at a rising edge once again, the Gate2 signal generates a rising edge, and at this time, a second row of liquid crystal cells are turned on. In this case, the TP signal is at a low level, and the row of black image data stored in the register is in an output state, so when the OE signal generates a falling edge, the row of black image data stored in the register is written into the second row of liquid crystal cells.

Subsequently, the CPV signal is at a rising edge once again, the Gate3 signal generates a rising edge, and at this time, a third row of liquid crystal cells are turned on. The TP signal is at a low level, the row of black image data stored in the register is in an output state. When the OE signal generates a falling edge, the row of black image data stored in the register is written into the third row of liquid crystal cells.

According to the foregoing method for writing data into the second row of liquid crystal cells, the rest operations can be deduced by analogy until the final row of liquid crystal cells complete writing. When each row of liquid crystal cells is sequentially turned on, the row of black image data stored in the register is written into liquid crystal cells which are currently turned on, so as to refresh each row of liquid crystal cells, thereby performing black frame insertion for each row of liquid crystal cells.

The black image is different from an ordinary image. Generally, rows of the ordinary image are different, so a picture expressing a specific meaning is formed, while rows of the black image are the same. Based on the foregoing difference between the black image and the ordinary image, in the entire black frame insertion period of the present invention, the register may output a row of data of the black image, and as long as the OE signal is enabled, the data is written into a corresponding row of liquid crystal cells which are turned on, until the data is written into all liquid crystal cells.

After data writing of the black image is completed, data writing continues to be performed for the image C according to the way image A is written.

According to the present invention, when the black data is written in the black frame insertion period, only one row of data is actually calculated, and a result thereof is in a state of being capable of being output, so when data writing is performed on another row of liquid crystal cells, the first row of data is directly adopted, and it is not required for each row of black data to be sent to the register when the TP signal is at a rising edge. The timing controller needs to provide only one row of black data and perform a gray scale voltage conversion calculation only once to perform black frame insertion on the whole field of liquid crystal cells, thereby, greatly reducing the calculation complexity and the amount of data operations in the black frame insertion process, and simplifying the driving complexity of black frame insertion.

In this exemplary embodiment, the time length of the frame period and the time length of the black frame insertion period are the same, and are both 1/f.

Figure 4:
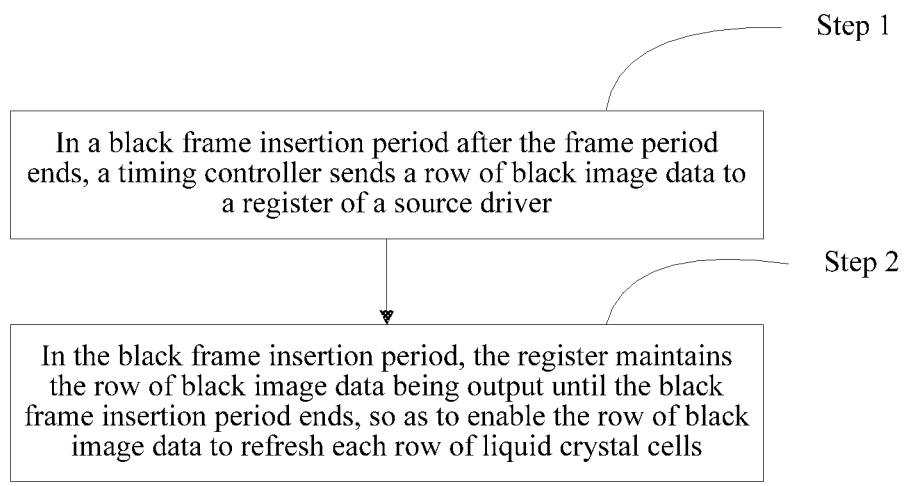
FIG. 4 is a flowchart of a liquid crystal driving method for black frame insertion of an image according to one embodiment of the present invention.

Referring to FIG. 4, a flowchart of a liquid crystal driving method for black frame insertion of an image is shown according to one embodiment of the present invention, which includes the following steps:

At step 1, in a black frame insertion period after the frame period ends, a row of black image data is sent to a register of a source driver by a timing controller.

At step 2, in the black frame insertion period, the row of black image data is kept, by the register, being output until the black frame insertion period ends, so as to enable the row of black image data to refresh (i.e., write into) each row of liquid crystal cells.

In the step 2 of maintaining, by the register, the row of black image data being output until the black frame insertion period ends, a TP signal is configured to have a falling edge and be at a low level until the black frame insertion period ends.

The black frame insertion process solves the crosstalk problem, but a problem of reducing the luminance of a 3D image is brought. For a shutter glasses-type 3D LCD device, a frame of image is divided into two fields of images to be displayed, and each of the two fields of images is received by an eye, so the luminance of the received image is reduced by half, i.e., 50%. Furthermore, in the shutter glasses-type 3D LCD device, a pair of 3D glasses needs to be worn, and the light transmittance of the 3D glasses is about 30%, so the luminance of a frame of complete image received by a human eye is only about 15% of that of displaying in the 2D manner. For example, for an image, when the LCD device performs displaying the image in the 2D manner, the luminance is 400 nit, and when the shutter glasses-type 3D LCD device is used for displaying such image, the luminance received by the human eye is only about 60 nit.

When the black frame insertion technology is adopted for solving the crosstalk problem, a field of black image further needs to be inserted between the left and right eye images. When the human eye receives the left eye image or the right eye image, according to the foregoing driving manner, the time length of inserting a left/right eye image is the same as the time length of inserting a black image, so that the human eye spends half the time in receiving the left eye image or the right eye image and another half the time in receiving the black image. The luminance of the black image is low, and almost zero, so the luminance of the image entering the human eye is further reduced by 50% on the basis of 15%. Therefore, the displaying luminance of the shutter glasses-type 3D LCD device adopting the black frame insertion technology is only 7.5% of the displaying luminance of 2D. For example, when the LCD device performs 2D displaying an image, the luminance is 400 nit, and when the shutter glasses-type 3D LCD device performs displaying such image, the luminance received by the human eye is only 30 nit. Reduction of the image luminance may deteriorate the 3D displaying effect.

Figure 5:
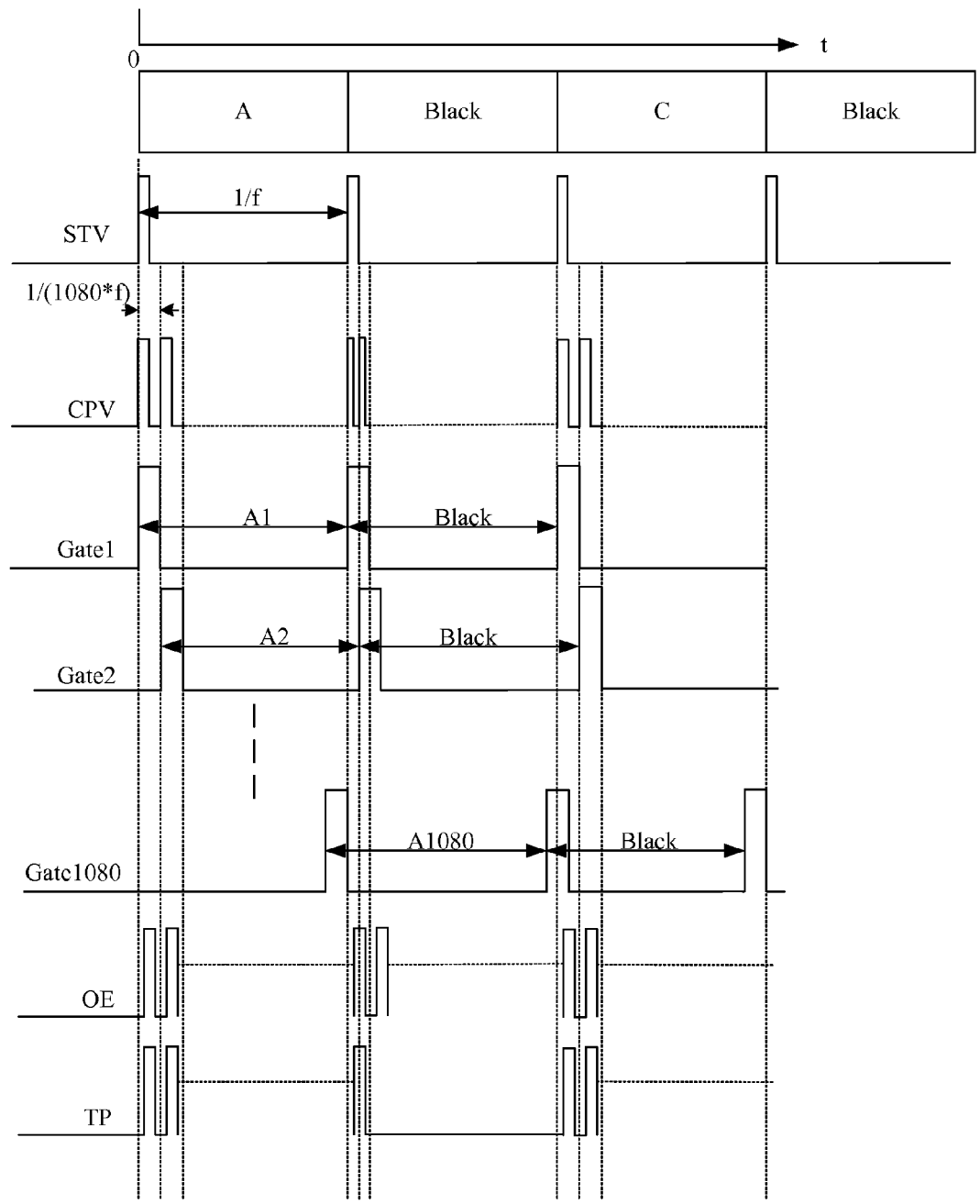
FIG. 5 is a driving timing diagram corresponding to double-row refreshing according to one embodiment of the present invention.

In one embodiment, the effect of the black frame insertion on the 3D displaying effect may be appropriately reduced by reducing the refreshing time of the black image, and improving the refreshing frequency of black frame insertion, that is, the black image is rapidly inserted. Specifically, in the frame period, the frequency f of the CPV is not changed. In the black frame insertion period, the frequency of the CPV signal is increased, as shown in FIG. 5. Normally, refreshing of a field of black image is completed in 1/f (1/f=4.3 ms at 240 Hz). If the frequency of the CPV signal in the black frame insertion period is doubled to become 2f, insertion of the black image is completed in the time of 1/(2f) (2.15 ms). If the frequency is doubled again to become 4f, insertion of the black image is completed in the time of 1/(4f) (1.075 ms). Therefore, the time length of the black frame insertion period is shortened, the time length of displaying the left and right eye images is increased in the unit time, the time length of displaying the black image is reduced, and the displaying luminance of the screen is improved. Moreover, the shorter the time length of the black frame insertion period is, the higher the luminance the obtained 3D image is. The luminance of a 3D image obtained through black frame insertion at a frequency that is fourfold that of the CPV signal in the black frame insertion period is higher than the luminance of a 3D image obtained through black frame insertion at a frequency double that of the CPV signal in the black frame insertion period.

When this rapid black frame insertion is adopted in conjunction with the method of controlling the TP signal according to the present invention, only one row of black image data is required be actually calculated in writing of the black data in the black frame insertion period, and a result row of black image data is maintained in a state capable of being output and to be repetitively utilized. When writing is performed on other rows, the first row of black image data is directly adopted, so as to prevent from sending each row of black data to the register and voltage converting at a rising edge of the TP signal. Accordingly, 1079 times of repetitive calculations are avoided for each field of black image, thereby greatly reducing the calculating complexity, reducing the data operation amount in the black frame insertion process, simplify the driving complexity of black frame insertion, and saving time consumed for 1079 times of calculations, so as to provide a compression space for compressing the black frame insertion period to the rapid black frame insertion, and ensure that the luminance of a 3D image is improved.

It should be appreciated that a specific time length of the black frame insertion period, i.e., the frequency of the CPV signal in the black frame insertion period, may be selected according to a factor such as a manufacturing process of an LCD panel.

Moreover, the foregoing rapid black frame insertion is the same as the black frame insertion according to the embodiment of the present invention shown in FIG. 3, and a black image is inserted between left and right eye images, so the effect of reducing the crosstalk may also be achieved.

FIG. 5 is a driving timing diagram corresponding to a double-row refreshing scheme by doubling the frequency of the CPV signal in the black frame insertion period according to one embodiment of the present invention. As shown in FIG. 5, in the frame period, the frequency of the CPV signal, the frequency of the OE signal, and the frequency of the TP signal are all kept unchanged, and the frequency of the CPV signal in the black frame insertion period is doubled.

In the black frame insertion period, in the latter half of the time length where the Gate1 signal is at a high level, the Gate2 signal is also at a high level. In this duration when the Gate1 signal and the Gate2 signal are at a high level simultaneously, a falling edge also occurs in the OE signal and the TP signal, which enables the data from the register to be written into the first and second row of liquid crystal cells simultaneously, thereby forming the double-row refreshing.

Likewise, when a falling edge occurs in the OE signal again, the TP signal is at a low level, and the Gate3 signal and the Gate4 signal are at a high level simultaneously. When a falling edge occurs in the OE signal once again, the TP signal is at a low level, and the Gate5 signal and the Gate6 signal are at a high level simultaneously. Accordingly, the scanning process is performed sequentially from top to bottom, whenever data is written, the data is written into two adjacent rows of liquid crystal cells simultaneously. Compared to the embodiment shown in FIG. 3, the refreshing frequency of the black frame insertion is doubled, and the black frame insertion is completed in the time of 1/(2f), thereby shortening the time length of the black frame insertion period, and implementing rapid black frame insertion.

Besides, the solution of the present invention is further applicable to various other screen refreshing schemes. For example, as shown in FIG. 6, a four-row refreshing scheme in the black frame insertion period in presented, where the frequency of the CPV signal in the black frame insertion period is set to 4 times of the frequency of the CPV signal in the frame period.

Figure 6:
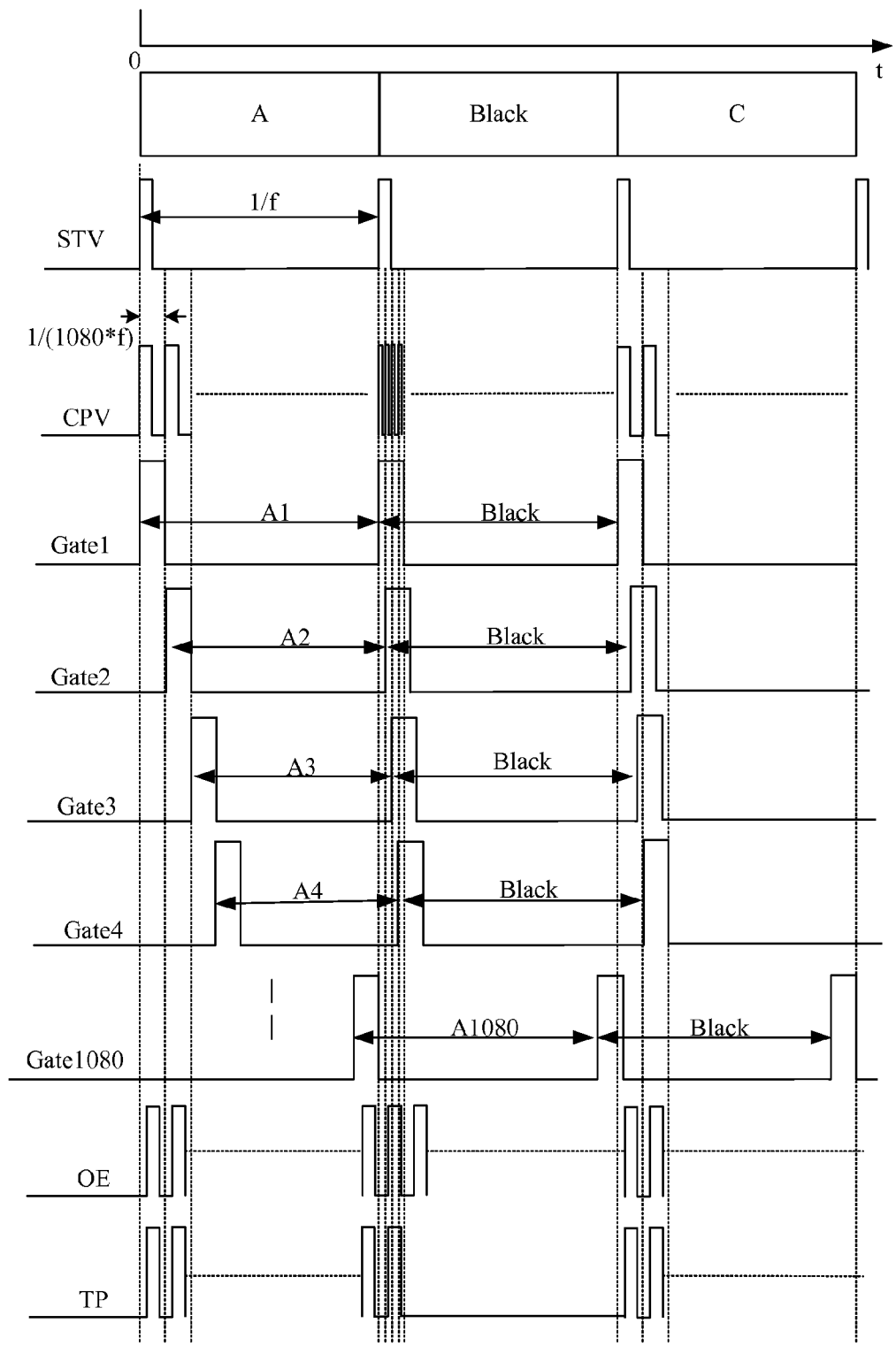
FIG. 6 is a driving timing diagram corresponding to four-row refreshing according to one embodiment of the present invention.

As shown in FIG. 6, in the frame period, the frequency of the CPV signal, the frequency of the OE signal, and the frequency of the TP signal are kept unchanged, and the frequency of the CPV signal in the black frame insertion period is 4 times of the frequency of the CPV signal in the frame period.

In the black frame insertion period, in the final ¼ of the time length where the Gate1 signal is at a high level, the Gate2 signal to the Gate4 signal are also at a high level. In this duration when the Gate1 signal to the Gate4 signal are at a high level simultaneously, a falling edge also occurs in the OE signal and the TP signal, which enables the data from the register to be written into the first, second, third, fourth rows of liquid crystal cells simultaneously, thereby forming the four-row refreshing.

Likewise, when a falling edge again occurs in the OE signal, the TP signal is at a low level, the Gate5 signal to the Gate 8 signal are simultaneously at a high level. When a falling edge once again occurs in the OE signal, the TP signal is at a low level, the Gate9 signal to the Gate12 signal are simultaneously at a high level. Accordingly, the scanning process is performed sequentially from top to bottom, whenever data is written, the data is written into four adjacent rows of liquid crystal cells simultaneously, so the refreshing frequency of the black frame insertion is 4 times of that of the embodiment in FIG. 4, and the rapid black frame insertion is completed in the time of 1/(4f), thereby shortening the time length of the black frame insertion period, and implementing the rapid black frame insertion.

It should be appreciated that other refreshing schemes are also within the disclosure scope of the present invention. For example, the frequency of the CPV signal in the black frame insertion period may be $2^N$ times of the frequency of the CPV signal in the frame period, where N is an integer greater than or equal to 0, thereby implementing a rapid black frame insertion of $2^N$-row refreshing.

The shorter the black frame insertion period is, the less the number of black images displayed in the unit time is; the more the number of displayed left and right eye images is, the larger the luminance of a formed 3D image is, and the better the displaying effect is.

The technical solution of the present invention is applied to black frame insertion control manners for all LCD devices, which are neither limited to a LCD device of 240 Hz or 120 Hz refreshing frequency, nor limited to a shutter glasses-type 3D LCD device.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A liquid crystal driving method for black frame insertion of an image, applied to a liquid crystal display (LCD) device, wherein during an image driving process, a frame period and a black frame insertion period are alternately next to each other, and the method comprises the steps of:
    in a black frame insertion period after the frame period ends, sending, by a timing controller, only one row of black image data to a register of a source driver to perform a gray scale voltage conversion calculation only once; and
    in the black frame insertion period, maintaining, by the register, the only one row of black image data being output from the register until the black frame insertion period ends, so as to enable the only one row of black image data to refresh each row of liquid crystal cells sequentially from a first row to a final row of the liquid crystal cells.

2. The method according to claim 1, wherein the step of maintaining, by the register, the only one row of black image data being output until the black frame insertion period ends comprises:
    generating, in a TP signal, a falling edge and maintaining the TP signal at a low level until the black frame insertion period ends.

3. The method according to claim 1, wherein
    the step of sending, by a timing controller, the only one row of black image data to the register of the source driver comprises:
    after the frame period ends, generating, in a CPV signal, a rising edge to turn on a first row of liquid crystal cells, and sending, by the timing controller, the only one row of black image data to the register of the source driver; and
    the step of maintaining, by the register, the only one row of black image data being output until the black frame insertion period ends comprises:
    in a duration when the first row of liquid crystal cells are turned on, when a falling edge in a TP signal occurs, setting an OE signal at a falling edge, refreshing the first row of liquid crystal cells with the only one row of black image data, maintaining the TP signal at a low level after the falling edge until the black frame insertion period ends; and in a duration when the TP signal is maintained at the low level, at each falling edge of the OE signal, refreshing a corresponding row of liquid crystal cells with the only one row black image data.

4. The method according to claim 1, wherein the method is applicable to a shutter glasses-type 3D LCD device.

5. The method according to claim 1, wherein in the black frame insertion period, a frequency of a TP signal is less than that of a CPV signal, wherein the TP signal is a latching signal of the data signal output by the timing controller to the source driver and configured such that each falling edge of the TP signal starts data writing in the liquid crystal cells, and wherein the CPV signal is a clock signal output by the timing controller to a gate driver and configured such that each rising edge of the CPV signal turns on a corresponding row of the liquid crystal cells.

6. The method according to claim 1, wherein a frequency of a CPV signal in the black frame insertion period is $2^N$ times of that of the CPV signal in the frame period, wherein N is an integer greater than or equal to 0.

7. A liquid crystal driving apparatus for black frame insertion of an image, comprising: a timing controller, a gate driver and a source driver, wherein during an image driving process, a frame period and a black frame insertion period are alternately next to each other,
  wherein the timing controller, the gate driver and the source driver are configured such that, in a black frame insertion period after the frame period ends, the timing controller sends only one row of black image data to a register of the source driver to perform a gray scale voltage conversion calculation only once, wherein the only one row of black image data is stored in the register; and the register maintains the only one row of black image data being output from the register until the black frame insertion period ends, so as to enable the only one row of black image data to refresh each row of liquid crystal cells sequentially from a first row to a final row of the liquid crystal cells.

8. The apparatus according to claim 7, wherein the timing controller is configured to generate control signals including at least a TP signal and a CPV signal.

9. The apparatus according to claim 8, wherein in the black frame insertion period, the timing controller controls the TP signal to generate a falling edge and be at a low level, so as to enable the register to maintain the only one row of black image data being output.

10. The apparatus according to claim 8, wherein a frequency of the CPV signal in the black frame insertion period is $2^N$ times of that of the CPV signal in the frame period, wherein N is an integer greater than or equal to 0.

11. The apparatus according to claim 7, being a shutter glasses-type 3D liquid crystal display device.

12. A liquid crystal display device comprising the liquid crystal driving apparatus according to claim 7.

13. A liquid crystal driving method for black frame insertion of an image in a black frame insertion period, applied to a liquid crystal display (LCD) device, comprising the steps of:
  sending, by a timing controller, only one row of black image data to a register of a source driver to perform a gray scale voltage conversion calculation only once, wherein the only one row of black image data is stored in the register;
  refreshing a first row of liquid crystal cells by using the only one row of black image data; and
  maintaining, by the register, the only one row of black image data being output from the register, and refreshing a second row of liquid crystal cells to a final row of liquid crystal cells sequentially by using the only one row of black image data.

14. The method according to claim 13, wherein the step of refreshing the first row of liquid crystal cells by using the only one row of black image data further comprises:
  in a duration when a CPV signal is at a high level, when a falling edge of a TP signal occurs, setting an OE signal at the falling edge, and refreshing the first row of liquid crystal cells with the only one row of black image data.

15. The method according to claim 13, wherein the step of maintaining, by the register, the only one row of black image data being output, and refreshing the second row of liquid crystal cells to the final row of liquid crystal cells sequentially by using the only one row of black image data further comprises:
  maintaining a TP signal at a low level; and in a duration when the TP signal is kept at the low level, when a CPV signal is at a high level and a falling edge occurs in an OE signal, refreshing a corresponding row of liquid crystal cells with the only one row of black image data.

16. The method according to claim 13, wherein a frequency of a CPV signal in the black frame insertion period is $2^N$ times of that of the CPV signal in the frame period, wherein N is an integer greater than or equal to 0.

* * * * *